US012619400B2

(12) United States Patent
Hou et al.

(10) Patent No.: US 12,619,400 B2
(45) Date of Patent: May 5, 2026

(54) MANAGEMENT OF A MULTI-LAYER MODEL PLATFORM

(71) Applicant: Capital One Services, LLC, McLean, VA (US)

(72) Inventors: Zhen Hou, Prosper, TX (US); Jake Lowell Blitch, Frisco, TX (US); Sreekanth Chinthagunta, Mckinney, TX (US); Antonio Valdes Cento, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 189 days.

(21) Appl. No.: 18/509,240

(22) Filed: Nov. 14, 2023

(65) Prior Publication Data

US 2025/0156158 A1 May 15, 2025

(51) Int. Cl.
*G06F 8/71* (2018.01)
*G06F 8/35* (2018.01)
(Continued)

(52) U.S. Cl.
CPC ................. *G06F 8/35* (2013.01); *G06F 8/71* (2013.01); *G06F 8/36* (2013.01); *G06F 8/433* (2013.01); *G06F 8/60* (2013.01); *G06F 8/65* (2013.01); *G06F 8/75* (2013.01); *G06F 8/76* (2013.01); *G06F 9/223* (2013.01); *G06F 9/4401* (2013.01); *G06F 9/4403* (2013.01);
(Continued)

(58) Field of Classification Search
CPC ..... G06F 8/35; G06F 8/71; G06F 8/75; G06F 8/36; G06F 8/65; G06F 8/60; G06F 8/433; G06F 8/76; G06F 9/5077; G06F 9/4403; G06F 9/44505; G06F 9/4401; G06F 9/5055; G06F 9/45558; G06F 9/5072; G06F 9/4843; G06F 9/223; G06F 11/3495; G06F 16/212; G06F 16/23; G06F 16/214

See application file for complete search history.

(56) References Cited

U.S. PATENT DOCUMENTS 7,770,151 B2 * 8/2010 Sanjar ................... G06F 11/366
717/109
10,785,128 B1 * 9/2020 Bawcom ................... G06F 8/38
(Continued)

OTHER PUBLICATIONS

Felix Diez, Framework for Orchestrating Application Deployments Using Multiple Deployment Technologies, Jul. 18, 2020, [Retrieved on Dec. 11, 2025]. Retrieved from the internet: <URL: https://elib. uni-stuttgart.de/server/api/core/bitstreams/24e423cd-25ed-4adc-91a4-6e12e09536df/> 63 Pages (1-63) (Year: 2020).*

*Primary Examiner* — Anibal Riveracruz
(74) *Attorney, Agent, or Firm* — Harrity & Harrity, LLP

(57) ABSTRACT

In some implementations, a system may obtain, using a configuration manager, a configuration file associated with a multi-layer model platform, the configuration file comprising one or more parameter values associated with one or more parameters, wherein the one or more parameters are associated with at least one data source, at least one model algorithm, a model structure, at least one model running environment, and at least one model dependency. The system may generate, using the configuration manager in association with the configuration file, a multi-layer model instance. The system may deploy the multi-layer model instance in the at least one model running environment.

20 Claims, 7 Drawing Sheets

400 →

(51) Int. Cl.

| | |
|---|---|
| *G06F 8/36* | (2018.01) |
| *G06F 9/4401* | (2018.01) |
| *G06F 9/445* | (2018.01) |
| *G06F 8/41* | (2018.01) |
| *G06F 8/60* | (2018.01) |
| *G06F 8/65* | (2018.01) |
| *G06F 8/75* | (2018.01) |
| *G06F 8/76* | (2018.01) |
| *G06F 9/22* | (2006.01) |
| *G06F 9/455* | (2018.01) |
| *G06F 9/48* | (2006.01) |
| *G06F 9/50* | (2006.01) |
| *G06F 11/34* | (2006.01) |
| *G06F 16/21* | (2019.01) |
| *G06F 16/23* | (2019.01) |

(52) U.S. Cl.
CPC ...... *G06F 9/44505* (2013.01); *G06F 9/45558* (2013.01); *G06F 9/4843* (2013.01); *G06F 9/5055* (2013.01); *G06F 9/5072* (2013.01); *G06F 9/5077* (2013.01); *G06F 11/3495* (2013.01); *G06F 16/212* (2019.01); *G06F 16/214* (2019.01); *G06F 16/23* (2019.01)

(56) References Cited

U.S. PATENT DOCUMENTS

| | | | | |
|---|---|---|---|---|
| 11,010,191 | B1 * | 5/2021 | Hornbeck | H04L 67/133 |
| 11,086,685 | B1 * | 8/2021 | Koppes | G06F 9/45558 |
| 11,782,888 | B2 * | 10/2023 | Sheela | G06F 16/9038 |
| | | | | 707/803 |
| 12,126,499 | B1 * | 10/2024 | Bhatnagar | H04L 41/069 |
| 2022/0035541 | A1 * | 2/2022 | Genereux | G06F 3/067 |
| 2023/0401045 | A1 * | 12/2023 | Bawcom | H04L 41/0806 |
| 2025/0068397 | A1 * | 2/2025 | Kandasamy | G06F 8/35 |

* cited by examiner

Data source(s)

Model algorithm(s)

Model structure(s)

Model running environment(s)

Model dependency(s)

Config. File 114

116 Process configuration file

Configuration Manager 108

Multi-layer model platform 102

100

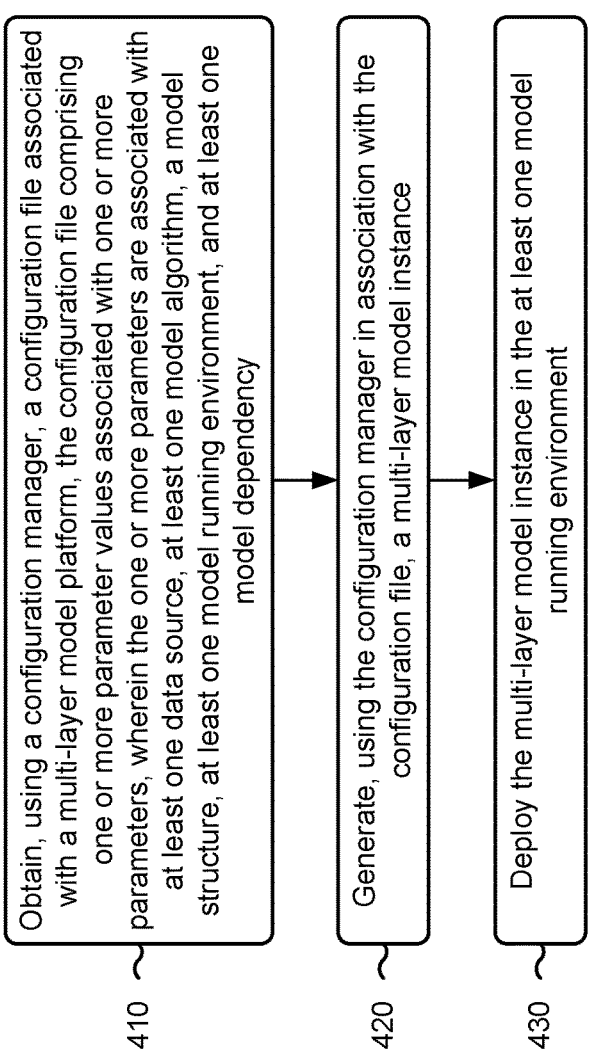

400

410   Obtain, using a configuration manager, a configuration file associated with a multi-layer model platform, the configuration file comprising one or more parameter values associated with one or more parameters, wherein the one or more parameters are associated with at least one data source, at least one model algorithm, a model structure, at least one model running environment, and at least one model dependency 420   Generate, using the configuration manager in association with the configuration file, a multi-layer model instance 430   Deploy the multi-layer model instance in the at least one model running environment

FIG. 4

MANAGEMENT OF A MULTI-LAYER MODEL PLATFORM

BACKGROUND

Computer-generated models can be used for any number of different tasks such as predicting outcomes of scenarios, assessing risk of taking certain actions, determining valuations, and/or the like. These models often may be complex, including many different layers of computation and analysis. Once developed, making changes to the model and/or adding layers to the model may involve developing additional source code or changing existing source code directly, thereby requiring computer programmers to affect the changes.

SUMMARY

Some implementations described herein relate to a system for management of a multi-layer model platform. The system may include one or more memories and one or more processors communicatively coupled to the one or more memories. The one or more processors may be configured to obtain, via a user interface associated with a configuration manager, user input indicative of one or more parameter values associated with one or more parameters of a configuration file associated with the multi-layer model platform, wherein the one or more parameters are associated with at least one data source, at least one model algorithm, a model structure, at least one model running environment, and at least one model dependency. The one or more processors may be configured to process, using the configuration manager, the configuration file to identify, for a multi-layer model instance, the at least one data source, the at least one model algorithm, the model structure, the at least one model running environment, and the at least one model dependency. The one or more processors may be configured to generate, using the configuration manager in association with the configuration file, the multi-layer model instance. The one or more processors, to generate the multi-layer model instance, may be configured to access, from a code library, one or more executable code components associated with the at least one model algorithm; access, from a data store, at least one set of data associated with the at least one data source; and assemble the multi-layer model instance in association with the model structure and the at least one model dependency. The one or more processors may be configured to deploy the multi-layer model instance in the at least one model running environment.

Some implementations described herein relate to a method of flexible management of a multi-layer model platform. The method may include obtaining, using a configuration manager, a configuration file associated with a multi-layer model platform, the configuration file comprising one or more parameter values associated with one or more parameters, wherein the one or more parameters are associated with at least one data source, at least one model algorithm, a model structure, at least one model running environment, and at least one model dependency. The method may include generating, using the configuration manager in association with the configuration file, a multi-layer model instance. The method may include deploying the multi-layer model instance in the at least one model running environment.

Some implementations described herein relate to a non-transitory computer-readable medium that stores a set of instructions. The set of instructions, when executed by one or more processors of a device, may cause the device to obtain, via a user interface associated with a configuration manager, user input indicative of one or more parameter values associated with one or more parameters of a configuration file associated with a multi-layer model platform, wherein the one or more parameters are associated with at least one data source, at least one model algorithm, a model structure, at least one model running environment, and at least one model dependency. The set of instructions, when executed by one or more processors of the device, may cause the device to generate, using the configuration manager in association with the configuration file, a multi-layer model instance. The set of instructions, when executed by one or more processors of the device, may cause the device to deploy the multi-layer model instance in the at least one model running environment.

BRIEF DESCRIPTION OF THE DRAWINGS

FIG. 4 is a flowchart of an example process associated with management of a multi-layer model, in accordance with some embodiments of the present disclosure.

DETAILED DESCRIPTION

Figure 1A:
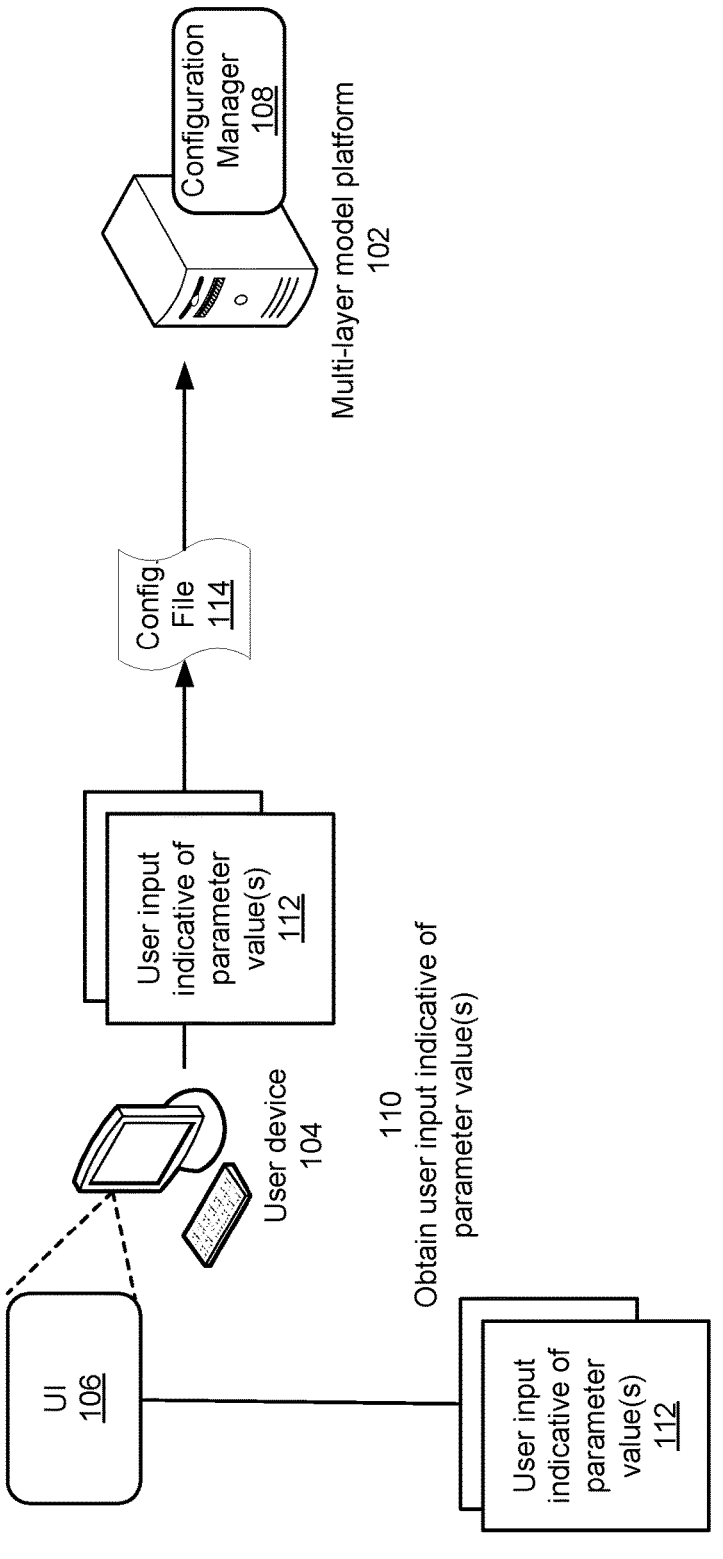
FIGS. 1A-1D are diagrams of an example implementation related to management of a multi-layer model platform, in accordance with some embodiments of the present disclosure.

The following detailed description of example implementations refers to the accompanying drawings. The same reference numbers in different drawings may identify the same or similar elements.

Complex computer-generated models may be complex, including many different layers of computation and analysis, complex model structures, and complex dependencies within the model (often between different layers of the model). In some cases, multi-layer models can be used to model a number of different scenarios. Once developed, making changes to the model and/or adding layers to the model may involve developing additional source code or changing existing source code directly, thereby requiring computer programmers to affect the changes.

For example, to reduce redundancy in source code generation and/or storage, a multi-layer model may be generated in a way that enables different model algorithms to be selected for a given scenario. In some cases, however, the model must be rebuilt, with calls to the different algorithms hard-coded into each different instantiation of the model. Additionally, if the sequential model structure (e.g., the order in which different components of the model are invoked) is to be changed for a given scenario, a programmer may need to write new source code for the new sequential model structure. Moreover, communication of model parameters between different layers of the model often are hard-coded into the different layers and changing the communication may involve re-coding the communications. Further, in some cases, a model running environment (e.g., the devices and/or computing entities on which a model is run) typically is difficult to change once a model has been generated, as the components often may be designed to be run in a specific running environment.

Some implementations described herein enable flexible and user-accessible management of a multi-layer model platform. In some implementations, for example, a multi-layer model platform may include a configuration manager that uses a single configuration file to facilitate management of a multi-layer model. The multi-layer model platform may be a computing-based architecture that facilitates the development and/or instantiation of a multi-level model instance. The multi-layer model platform may include any number of different types of pipeline and/or architectures. The configuration manager may be a computing entity (e.g., a software component, a hardware component, and/or a firmware component) that enables customizable management of a multi-layer model by using the configuration file to assemble the multi-layer model. The configuration manager may be a component of the multi-layer model platform. For example, in some implementations, the configuration manager may be a software entity within a software development kit (SDK), a software module associated with a web service, an application programming interface (API), and/or an infrastructure as code (IaC) entity, among other examples. IaC is an infrastructure configuration that is defined by code in one or more files.

In some implementations, for example, the configuration manager may obtain, via a user interface, user input indicative of one or more parameter values associated with one or more parameters. The one or more parameter values may be associated with respective parameters of a configuration file associated with a multi-layer model platform. The configuration manager may provide the user input to the configuration file. In some implementations, the configuration manager may generate the configuration file. The configuration file may be a file generated in a format corresponding to a human-readable data-serialization language such as, for example, a JavaScript Object Notation (JSON) file format and/or a YAML file format, among other examples. In this way, some implementations may facilitate receiving user input from a variety of different types of users without the necessity of new source code being written to facilitate each change to a multi-layer model.

In some implementations, generating the configuration file may include providing information received via a user interface to an existing file. For example, a configuration file may be generated and used by the configuration manager. In some implementations, for example, the configuration manager may cause a user interface to be presented, via a display device of a user device. The user interface may include one or more fields (e.g., text fields, selection menus, drop-down menus, and/or buttons, among other examples) configured to obtain user inputs from a user of the user device. The configuration manager may map the user inputs to corresponding fields in the configuration file. In this way, some implementations may facilitate improvement of a user experience in the model development process by enabling a range of users that are not software developers (e.g., programmers) to provide inputs to the configuration file.

In some implementations, a sequential model structure may be specified within the configuration file (e.g., by a combination of keys and values), and the configuration manager may iteratively solve the model structure and build the sequential model building workflow. Within each layer of a configuration of the multi-layer model, users may specify, via the configuration file, the model algorithm or algorithms to be included. In some aspects, a user may add customized model dependencies to the multi-layer model by providing user input to the configuration manager (e.g., by addressing a key word of a model name in the configuration file and/or by indicating a dependency function coded within the multi-layer model platform).

In some implementations, the configuration file also may indicate a model running environment or environments. The model running environment may be used to run the model for the purpose of training one or more machine learning models included in the model structure or for running the model in a deployment scenario. The model running environment may be specified for the multi-layer model as a whole and/or per component (e.g., layer) of the multi-layer model. A model running environment for one or more aspects of a multi-layer model may include one or more central processing units (CPUs) of one or more computing devices (e.g., server devices and/or user devices), and/or one or more graphics processing units (GPUs) of one or more computing devices (e.g., user devices), among other examples.

By implementing a configuration manager that uses a configuration file to facilitate developing a multi-level model instance, some implementations may provide a user-friendly customizable multi-layer model platform. By using a single configuration file that uses a human-readable language to specify the model structure and dependencies, some implementations may enable a non-programmer user to choose one or more model algorithms for use in a multi-layer model. By using a configuration manager that generates a multi-layer model instance based on a configuration specified in a single configuration file, some implementations enable the sequential model structure of a multi-layer model to be changed as frequently as desired without a programmer needing to recode the architecture for each change. By using a human-readable configuration file by which a user can specify model dependencies, some implementations may facilitate flexible parameter communication between different model layers. By using a configuration file that allows for per-layer configuration of running environments, some implementations may enable each layer of a multi-layer model to be run (e.g., for training or deployment) in an appropriate running environment.

FIGS. 1A-1D are diagrams of an example implementation 100 related to management of a multi-layer model platform. As shown in FIGS. 1A-1D, example implementation 100 includes a multi-layer model platform 102 (referred to herein interchangeably as a "system" instead of a "platform") and a user device 104 configured to present a user interface (UI) 106. As shown, the multi-layer model platform 102 may include a configuration manager 108. In some implementations, the multi-layer model platform 102 may include more than one configuration manager 108. In some implementations, the configuration manager 108 may be instantiated via a web service associated with the multi-layer model platform 102. In some implementations, the configuration manager 108 may be instantiated by a web service independent of the multi-layer model platform 102. In some implementations, the configuration manager 108 may be instantiated via a software as a service (SaaS) model, via an IaC platform, via a transitory computer-readable medium, and/or via a client instantiated at the user device 104, among other examples.

As shown by reference number 110, the multi-layer model platform 102 may obtain, via the user interface 108 associated with the configuration manager 108, user input 112 indicative of one or more parameter values associated with one or more parameters of a configuration file 114. The configuration file 114 may be associated with the multi-layer model platform 102. For example, as shown, the configuration manager 108 may cause the user device 104 to present, via a display device, the UI 106, which may be used to obtain the user input 112. The UI 106 of the configuration manager 108 may include an interactive interface configured to receive non-code user inputs. The UI 106 may be any type of graphical UI (GUI) configured to present information and receive user input (e.g., via interactive text fields, user-selectable buttons, and/or drop-down menus, among other examples). In some implementations, for example, the UI 106 may present a set of representations of selectable parameter values, and a user may provide user input 112 indicating one or more of the selectable parameter values. In some implementations, the UI 106 may present an interactive UI element that enables the user to input one or more values associated with one or more parameters. In some aspects, the one or more parameters may be associated with at least one data source, at least one model algorithm, at least one model structure, at least one model running environment, and/or at least one model dependency, among other examples.

In some implementations, the one or more parameter values may be indicative of a layer to be included in the multi-layer model instance. In some implementations, the one or more parameters may be indicative of a respective model algorithm, of a plurality of model algorithms, associated with each layer of the plurality of layers of the multi-layer model instance 120. For example, in some implementations, the one or more parameter values may indicate which algorithm or algorithms are to be included within each layer of the multi-layer model instance. In this way, some implementations may facilitate changing the algorithm or algorithms associated with a layer by simply indicating the change in the configuration file 114, enabling additional layers and/or algorithms to be added to an existing multi-layer model instance without the need for writing additional code (e.g., in cases in which the additional algorithm or algorithms are already coded and stored in a code library).

In some implementations, the one or more parameters may be indicative of a respective model running environment, of a plurality of model running environments, associated with each layer of a plurality of layers of the multi-layer model instance. The plurality of model running environments may include, for example, a CPU of a computing device, a GPU of a computing device, a distributed model running environment, and/or any combination thereof. In some implementations, for the example, the configuration file 114 may indicate a type of model running environment. In some implementations, the configuration file 114 may indicate a specific model running environment. In some implementations, for example, the configuration manager 108 may deploy aspects of a multi-layer model instance to one or more devices for running the model. In this way, some implementations may facilitate switching from one model running environment to another model running environment by providing a new corresponding parameter value to the configuration manager 108 (e.g., via the UI 106).

In some implementations, a model dependency may indicate at least one parameter communication between at least two layers of a multi-layer model instance. In some implementations, the at least one model dependency may include a dependency function associated with a key word. The user input 112 may indicate the key word. For example, a dependency function may include a function, an algorithm, a function call, an API, and/or the like, that facilitates providing a value associated with a parameter of one layer of the multi-layer model instance to a parameter of another layer of the multi-layer model instance. In some implementations, a key word or words may identify the type of dependency function, one or more parameters associated with the dependency function, and/or a version associated with the dependency function, among other examples. The user may input (e.g., via text input, drop-down menu selection, button selection, etc.) the key word via the UE 106 to cause the configuration file 114 to indicate the dependency function.

Figure 1B:
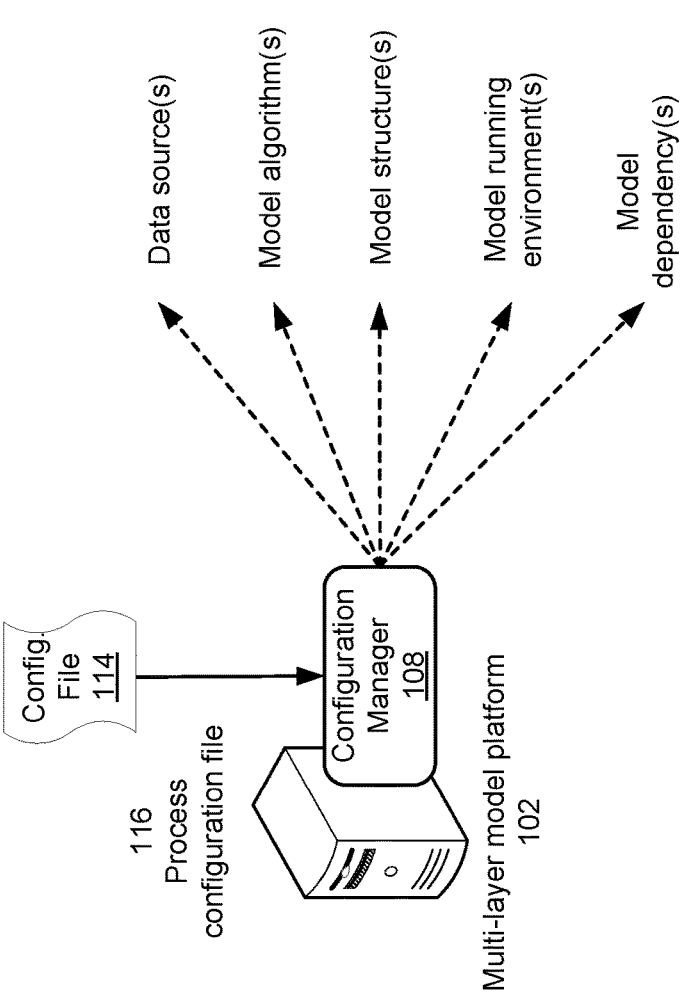
Figure 1C:
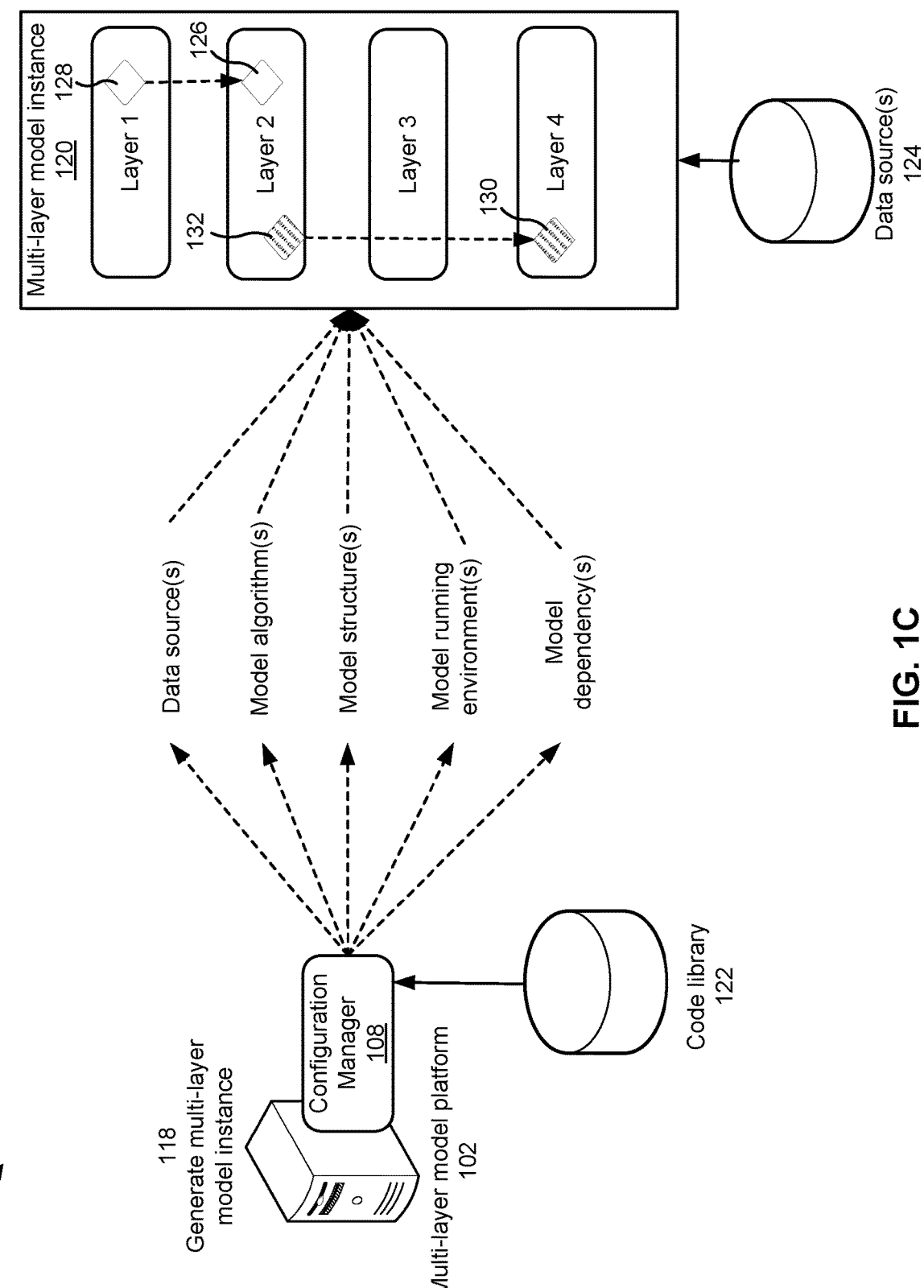

As shown by reference number 116 in FIG. 1B, the multi-layer model platform 102 may process, using the configuration manager 108, the configuration file 114 to identify, for a multi-layer model instance, the at least one data source, the at least one model algorithm, the model structure, the at least one model running environment, and the at least one model dependency. As shown by reference number 118 in FIG. 1C, the multi-layer model platform 102 may generate, using the configuration manager 108 in association with the configuration file 114, a multi-layer model instance 120. For example, in some implementations, to generate the multi-layer model instance 120, the configuration manager 108 may access, from a code library 122, one or more executable code components associated with at least one model algorithm. The configuration manager 108 may access, from a data store 124, at least one set of data associated with the at least one data source. The configuration manager 108 may assemble the multi-layer model instance 120 in association with the model structure specified in the configuration file 114 and the at least one model dependency specified in the configuration file 114. For example, the configuration manager 108 may sequentially execute the code components to perform the algorithm or algorithms associated with the multi-level model instance 120. In some implementations, generating the multi-level model instance 120 may include assembling a software package configured to perform one or more tasks associated with the multi-level model instance 120, compiling the software package, and/or testing the software package. For example, the configuration manager 108 may retrieve source code from the code library 122 to generate algorithms for each layer (e.g., shown as "Layer 1," "Layer 2," "Layer 3," and "Layer 4") of the multi-layer model instance 120. The configuration manager 108 may establish (e.g., via function calls, APIs, etc.) model dependencies that may include communication of parameters between different layers of the multi-layer model instance 120. For example, as shown in FIG. 1C, a Layer 2 parameter 126 may be defined by a value of a Layer 1 parameter 128 and a Layer 4 parameter 130 may be defined by a value of a Layer 2 parameter 132.

Figure 1D:
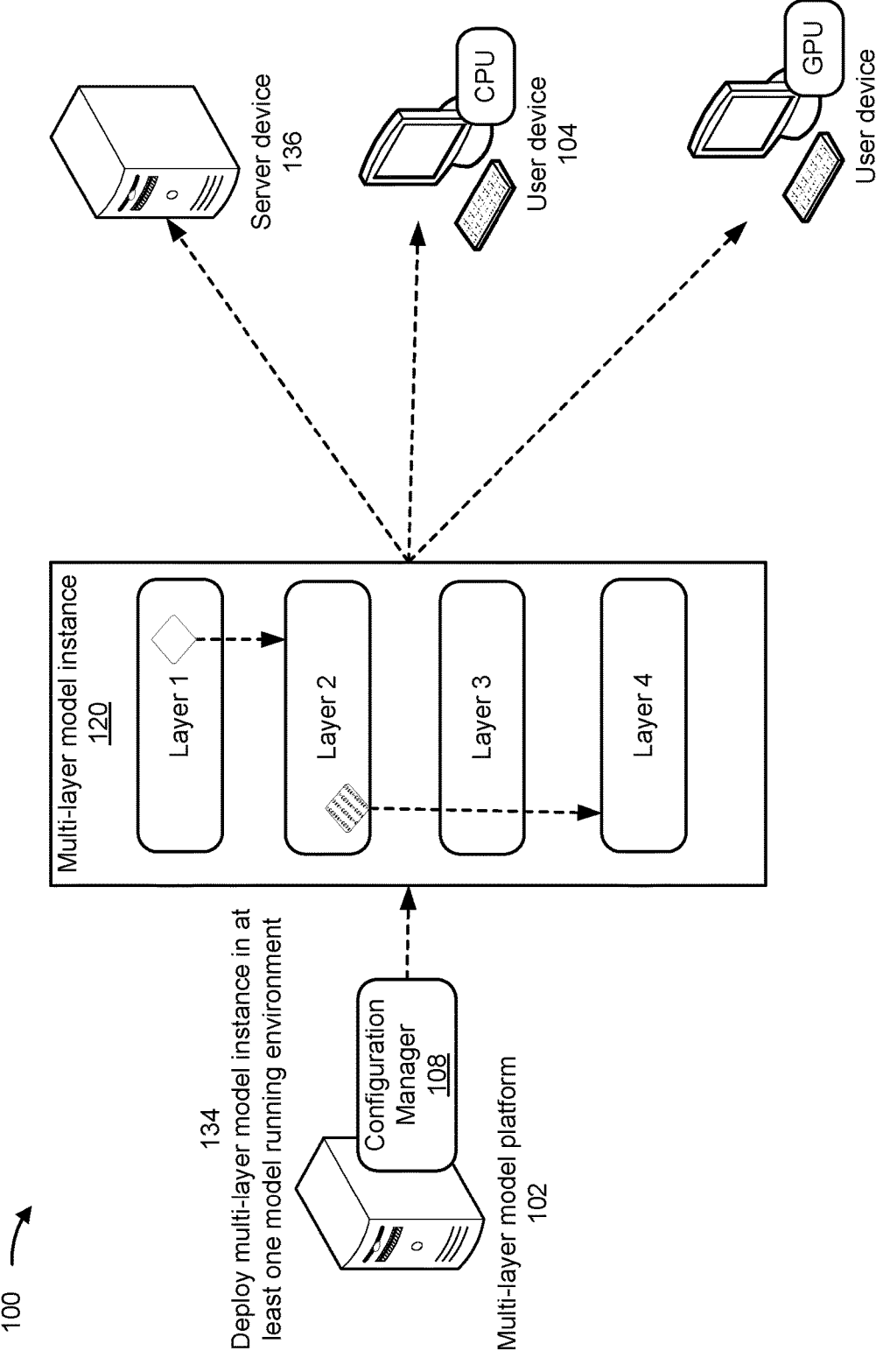

As shown by reference number 134 in FIG. 1D, the multi-layer model platform 102 may deploy the multi-layer model instance 120 in at least one model running environment. For example, the configuration manager 108 may determine model running environments for deployment of each layer of the multi-layer model instance 120 based on the configuration file 114 and/or based on attributes of the intended model running environments. For example, in some implementations, one or more layers of the multi-layer model instance 120 may be deployed to one or more CPUs of one or more user devices 104 and/or one or more server devices 136. One or more layers of the multi-layer model instance 120 may be deployed to one or more GPUs of one or more user devices 104 and/or one or more server devices 136. Some layers may be deployed to CPUs or GPUs based on a type of processing library associated with the layer, since CPUs and GPUs may have different architectures and libraries associated therewith. In some aspects, for example, the configuration file 114 may indicate that the multi-layer model instance 120 is to be deployed in a distributed running environment, and the configuration manager 108 may determine, based on attributes of computing devices within the distributed running environment, to which devices and/or processors one or more layers of the multi-layer model instance 120 are to be distributed. The attributes may include, for example, a quantity of computing devices available in the distributed computing environment, a number of cores associated with each of the computing devices, and/or an available memory associated with each of the computing devices, among other examples. In some implementations, for example, the distributed running environment may include a cloud computing system 202 depicted in FIG. 2.

In some implementations, subsequent to deployment of the multi-layer model instance 120, the multi-layer model platform 120 may obtain, via the user interface 106, additional user input indicative of one or more updated parameter values associated with the one or more parameters. The multi-layer model platform 120 may generate, in association with the one or more updated parameter values, an updated multi-layer model instance. In some implementations, the configuration manager 108 may update one or more layers of the deployed multi-layer model instance 120 without disrupting the running of one or more of the other layers of the deployed multi-layer model instance 120.

As described above, some implementations include a configuration manager 108 configured to process a single configuration file for development and deployment of a multi-layer model instance. In some implementations, the single configuration file contains all of the required information for the configuration manager 108 to create, train, and/or solve (e.g., execute) multi-layer models. In some implementations, because the configuration file is formatted in accordance with a human-readable language (e.g., YAML), a user can read the single configuration file to understand the structure and all the dependencies of a multi-layer model instance without reading the source code. In some implementations, the user can change the configuration file to alter the model algorithm, model structure, model running environment, and/or the model dependencies without changing any code inside the multi-layer model platform 102, thereby minimizing hard-coding and manual operations. In some implementations, by using the single configuration file, the user can perform the model development project from end to end without hard-coding any model structure or model dependencies. In some implementations, the single configuration file also may ensure model reproducibility for future reference. The key names and values inside the configuration file may be straightforward to understand, thereby reducing user onboarding time of the model development platform.

Figure 2:
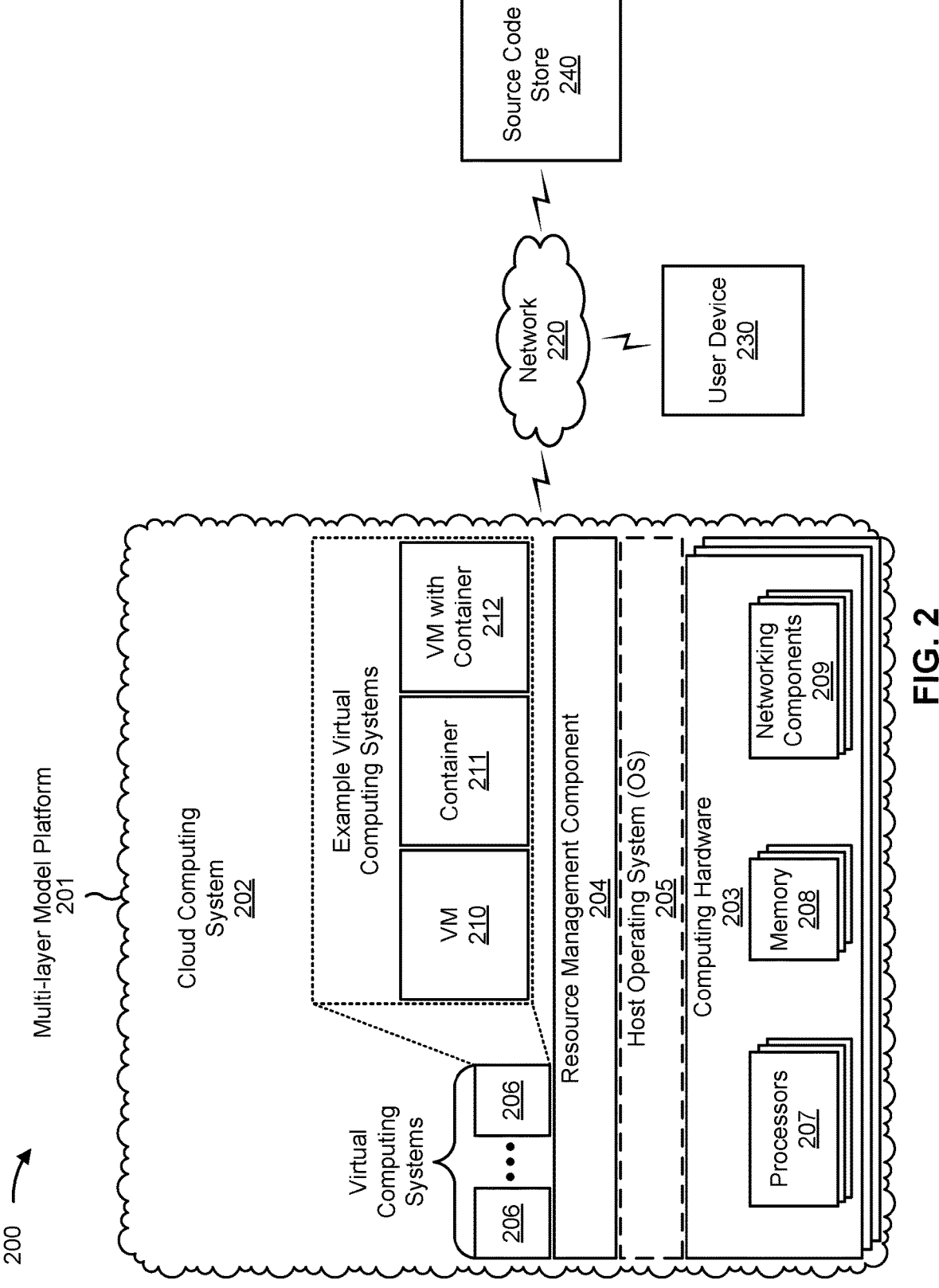
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a multi-layer model platform 201, which may include one or more elements of and/or may execute within a cloud computing system 202. In some implementations, the model running environment may include, or be included in, the cloud computing system 202. The cloud computing system 202 may include one or more elements 203-212, as described in more detail below. As further shown in FIG. 2, environment 200 may include a network 220, a user device 230, and/or a source code store 240. In some aspects, the user device 230 and/or the source code store 240 may be included within the cloud computing system 202. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A container 211 may include an environment associated with executing an application in the cloud computing system 202. For example, a container 211 may include application code, runtime, system tools, libraries, and/or settings, among other examples, associated with executing an application. In some implementations, each container 211 may be associated with a dedicated file system, network interfaces, and/or process namespace, among other examples. Containers 211 and virtual machines 210 may provide isolation and abstraction for applications. In some implementations, a container 211 may be referred to as a Docker container, such as when a container 211 utilizes Docker as a containerization platform. A virtual machine 210 may be associated with a full copy of a host operating system (e.g., the host operating system 205) to enable the virtual machine 210 to operate. A container 211 may share a host operating system kernel with the cloud computing system 202 and may only include the software libraries and dependencies needed to run an application (e.g., enabling the container 211 to be smaller in size than a virtual machine 210 and to stop and/or start operations faster than a virtual machine 210).

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the multi-layer model platform 201 may include one or more elements 203-212 of the cloud computing system 202, may execute within the cloud computing system 202, and/or may be hosted within the cloud computing system 202, in some implementations, the multi-layer model platform 201 may not be cloud-based (e.g., may be implemented outside of a cloud computing system) or may be partially cloud-based. For example, the multi-layer model platform 201 and/or the model running environment may include one or more devices that are not part of the cloud computing system 202, such as device 300 of FIG. 3, which may include a standalone server (e.g., server device 136) or another type of computing device (e.g., user device 104). The multi-layer model platform 201 and/or the model running environment may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 may include one or more devices capable of receiving, generating, storing, processing, providing, and/or routing information associated with model development and/or deployment within cloud computing environments, such as the multi-layer model platform 201, as described elsewhere herein. The user device 230 may include a communication device and/or a computing device. For example, the user device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The source code store 240 may include a communication device and/or a computing device. For example, the source code store 240 may include a server, such as an application server, a client server, a web server, a database server, a host server, a proxy server, a virtual server (e.g., executing on computing hardware), or a server in a cloud computing system. In some implementations, the source code store 240 may include computing hardware used in a cloud computing environment, such as the multi-layer model platform 201.

The source code store 240 may include one or more devices capable of receiving, generating, storing, processing, and/or providing one or more code libraries containing source code for model development and/or deployment in cloud computing environments, as described elsewhere herein. The source code store 240 may include a data structure, a cache, a database, a data source, a server, a database server, an application server, a client server, a web server, a host server, a proxy server, a virtual server (e.g., executing on computing hardware), a server in a cloud computing system, a device that includes computing hardware used in the cloud computing environment 200, or a similar type of device. As an example, the source code store 240 may store source code for instantiating one or more multi-level models via the multi-layer model platform 201, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
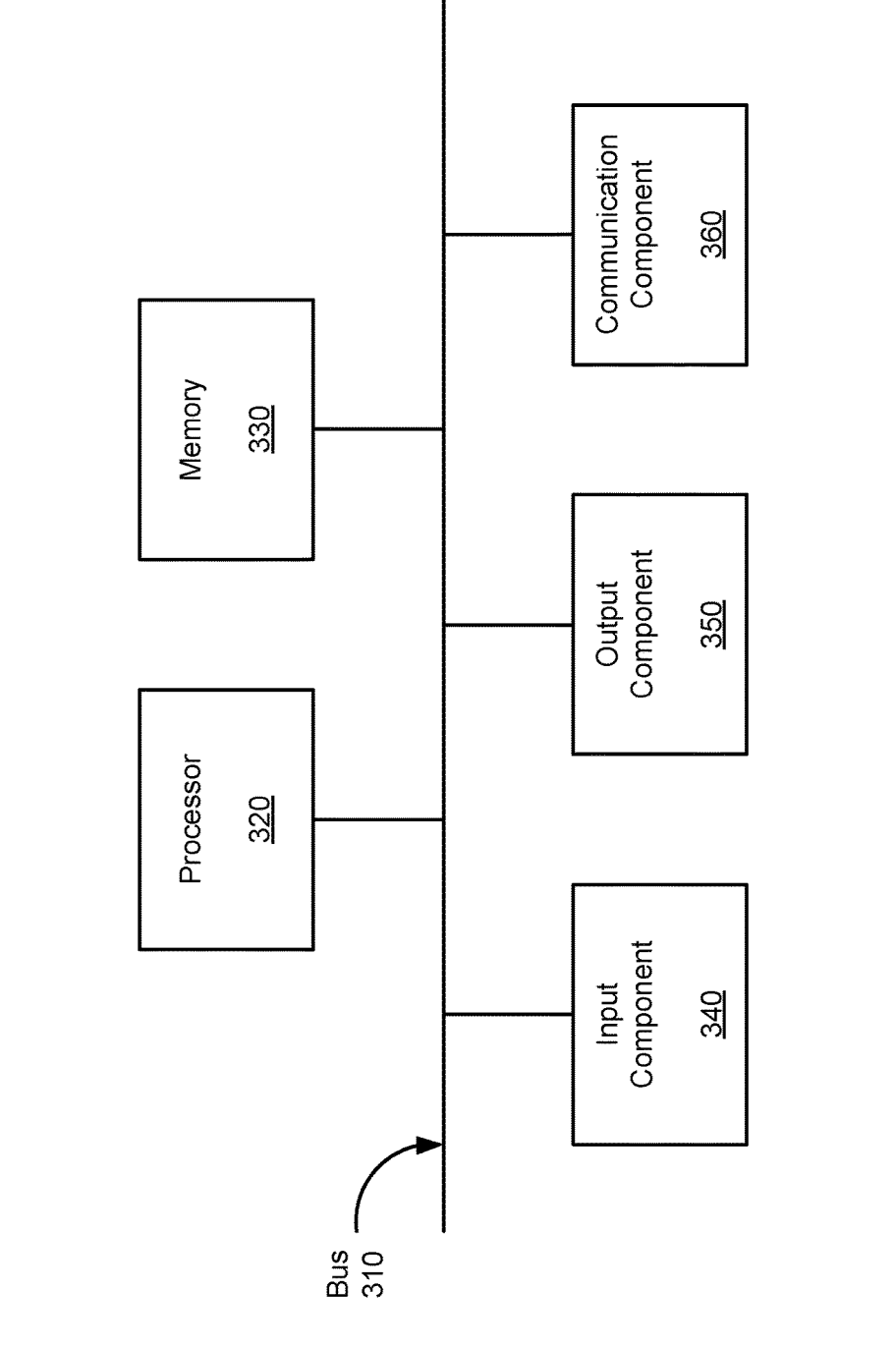
FIG. 3 is a diagram of example components of a device associated with management of a multi-layer model platform, in accordance with some embodiments of the present disclosure.

FIG. 3 is a diagram of example components of a device 300 associated with management of a multi-layer model platform. The device 300 may correspond to the cloud computing system 202 (and/or one or more devices or components of the cloud computing system 202), the user device 230, and/or the source code store 240. In some implementations, the cloud computing system 202 (and/or one or more devices or components of the cloud computing system 202), the user device 230, and/or the source code store 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with management of a multi-layer model. In some implementations, one or more process blocks of FIG. 4 may be performed by the multi-layer model platform 201. In some implementations, one or more process blocks of FIG. 4 may be performed by another device or a group of devices separate from or including the multi-layer model platform 201, such as the user device 230, the cloud computing system 202 and/or the source code store 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining, using a configuration manager, a configuration file associated with a multi-layer model platform, the configuration file comprising one or more parameter values associated with one or more parameters, wherein the one or more parameters are associated with at least one data source, at least one model algorithm, a model structure, at least one model running environment, and at least one model dependency (block 410). For example, the multi-layer model platform 201 and/or the user device 230 (e.g., using processor 320, memory 330, input component 340, output component 350, and/or communication component 360) may obtain, using a configuration manager, a configuration file associated with a multi-layer model platform, the configuration file comprising one or more parameter values associated with one or more parameters, wherein the one or more parameters are associated with at least one data source, at least one model algorithm, a model structure, at least one model running environment, and at least one model dependency, as described above in connection with reference number 110 of FIG. 1A.

As further shown in FIG. 4, process 400 may include generating, using the configuration manager in association with the configuration file, a multi-layer model instance (block 420). For example, the multi-layer model platform 201 and/or the user device 230 (e.g., using processor 320, memory 330, input component 340, output component 350, and/or communication component 360) may generate, using the configuration manager in association with the configuration file, a multi-layer model instance, as described above in connection with reference number 118 of FIG. 1C.

As further shown in FIG. 4, process 400 may include deploying the multi-layer model instance in the at least one model running environment (block 430). For example, the multi-layer model platform 201 and/or the user device 230 (e.g., using processor 320, memory 330, input component 340, output component 350, and/or communication component 360) may deploy the multi-layer model instance in the at least one model running environment, as described above in connection with reference number 134 of FIG. 1D.

In some implementations, process 400 may further include obtaining user input indicative of the one or more parameter values. In some implementations, process 400 may further include processing, using the configuration manager, the configuration file to identify, for a multi-layer model instance, the at least one data source, the at least one model algorithm, the model structure, the at least one model running environment, and the at least one model dependency. In some implementations, the configuration file may include a human-readable data-serialization language file. In some implementations, generating the multi-layer model instance may include accessing, from a code library, one or more executable code components associated with the at least one model algorithm; accessing, from a data store, at least one set of data associated with the at least one data source; and assembling the multi-layer model instance in association with the model structure and the at least one model dependency. In some implementations, generating the multi-layer model instance may include generating the multi-layer model instance in association with only one configuration file. In some implementations, process 400 may include obtaining, via the user interface, additional user input indicative of one or more updated parameter values associated with the one or more parameters; and generating, in association with the one or more updated parameter values, an updated multi-layer model instance.

In some implementations, the one or more parameter values may be indicative of a layer to be included in the multi-layer model instance. In some implementations, the one or more parameters may be indicative of a respective model running environment, of a plurality of model running environments, associated with each layer of a plurality of layers of the multi-layer model instance. The plurality of model running environments may include at least one of a CPU of a computing device, a GPU of a computing device, or a distributed model running environment. In some implementations, the at least one model dependency may indicate at least one parameter communication between at least two layers of the multi-layer model instance. In some implementations, the at least one model dependency may include a dependency function associated with a key word, and wherein the user input indicates the key word. In some implementations, the one or more parameters may be indicative of a respective model algorithm, of a plurality of model algorithms, associated with each layer of a plurality of layers of the multi-layer model instance.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for management of a multi-layer model platform, the system comprising:

one or more memories; and one or more processors, communicatively coupled to the one or more memories, configured to:

obtain, via a user interface associated with a configuration manager, user input indicative of one or more parameter values associated with one or more parameters of a single configuration file associated with the multi-layer model platform, wherein the one or more parameters are associated with at least one data source, at least one model algorithm, a model structure, at least one model running environment, and at least one model dependency;

process, using the configuration manager, the single configuration file to identify, for a multi-layer model instance, the at least one data source, the at least one model algorithm, the model structure, the at least one model running environment, and the at least one model dependency;

generate, using the configuration manager in association with the single configuration file, the multi-layer model instance, wherein the one or more processors, to generate the multi-layer model instance, are configured to:

access, from a code library, one or more executable code components associated with the at least one model algorithm;

access, from a data store, at least one set of data associated with the at least one data source; and assemble the multi-layer model instance in association with the model structure and the at least one model dependency, wherein the one or more processors to assemble the multi-layer model instance, are configured to:

establish model dependencies that include communication of parameters, of the one or more parameters, between different layers of the multi-layer model instance; and deploy the multi-layer model instance in the at least one model running environment.

2. The system of claim 1, wherein the one or more parameter values are indicative of a layer to be included in the multi-layer model instance.

3. The system of claim 1, wherein the one or more parameters are indicative of a respective model running environment, of a plurality of model running environments, associated with each layer of a plurality of layers of the multi-layer model instance.

4. The system of claim 3, wherein the plurality of model running environments comprise at least one of a central processing unit (CPU) of a computing device, a graphics processing unit (GPU) of a computing device, or a distributed model running environment.

5. The system of claim 1, wherein the at least one model dependency comprises a dependency function associated with a key word, and wherein the user input indicates the key word.

6. The system of claim 1, wherein the one or more parameters are indicative of a respective model algorithm, of a plurality of model algorithms, associated with each layer of a plurality of layers of the multi-layer model instance.

7. The system of claim 1, wherein the single configuration file comprises a human-readable data-serialization language file.

8. The system of claim 1, wherein the one or more processors, to generate the multi-layer model instance, are configured to generate the multi-layer model instance in association with only one configuration file, the only one configuration file comprising the single configuration file.

9. The system of claim 1, wherein the one or more processors are further configured to:

obtain, via the user interface, additional user input indicative of one or more updated parameter values associated with the one or more parameters; and generate, in association with the one or more updated parameter values, an updated multi-layer model instance.

10. The system of claim 1, wherein the single configuration file uses a human-readable language to specify the model structure and the at least one model dependency.

11. A method of flexible management of a multi-layer model platform, comprising:

obtaining, using a configuration manager, a single configuration file associated with a multi-layer model platform, the single configuration file comprising one or more parameter values associated with one or more parameters, wherein the one or more parameters are associated with at least one data source, at least one model algorithm, a model structure, at least one model running environment, and at least one model dependency;

generating, using the configuration manager in association with the single configuration file, a multi-layer model instance, wherein generating the multi-layer model instance comprises:

establishing model dependencies that include communication of parameters, of the one or more parameters, between different layers of the multi-layer model instance; and deploying the multi-layer model instance in the at least one model running environment.

12. The method of claim 11, further comprising:

obtaining user input indicative of the one or more parameter values.

13. The method of claim 11, wherein generating the multi-layer model instance comprises:

accessing, from a code library, one or more executable code components associated with the at least one model algorithm;

accessing, from a data store, at least one set of data associated with the at least one data source; and assembling the multi-layer model instance in association with the model structure and the at least one model dependency.

14. The method of claim 11, wherein the one or more parameters are indicative of a respective model running environment, of a plurality of model running environments, associated with each layer of a plurality of layers of the multi-layer model instance.

15. The method of claim 11, wherein the one or more parameters are indicative of a respective model algorithm, of a plurality of model algorithms, associated with each layer of a plurality of layers of the multi-layer model instance.

16. The method of claim 11, wherein the single configuration file uses a human-readable language to specify the model structure and the at least one model dependency.

17. A non-transitory computer-readable medium storing a set of instructions, the set of instructions comprising:

one or more instructions that, when executed by one or more processors of a device, cause the device to:

obtain, via a user interface associated with a configuration manager, user input indicative of one or more parameter values associated with one or more parameters of a single configuration file associated with a multi-layer model platform, wherein the one or more parameters are associated with at least one data source, at least one model algorithm, a model structure, at least one model running environment, and at least one model dependency;

generate, using the configuration manager in association with the single configuration file, a multi-layer model instance, wherein the one or more instructions, that cause the device to generate the multi-layer model instance, cause the device to:

establish model dependencies that include communication of parameters, of the one or more parameters, between different layers of the multi-layer model instance; and deploy the multi-layer model instance in the at least one model running environment.

18. The non-transitory computer-readable medium of claim 17, wherein the one or more instructions, that cause the device to generate the multi-layer model instance, cause the device to:

access, from a code library, one or more executable code components associated with the at least one model algorithm;

access, from a data store, at least one set of data associated with the at least one data source; and assemble the multi-layer model instance in association with the model structure and the at least one model dependency.

19. The non-transitory computer-readable medium of claim 17, wherein the one or more parameters are indicative of a respective model running environment, of a plurality of model running environments, associated with each layer of a plurality of layers of the multi-layer model instance.

20. The non-transitory computer-readable medium of claim 17, wherein the single configuration file comprises a human-readable data-serialization language file.

* * * * *